Sept. 14, 1954
R. E. SEARS
2,688,951
PRESSURE FLUID MOTOR
Filed Dec. 28, 1951
3 Sheets-Sheet 1
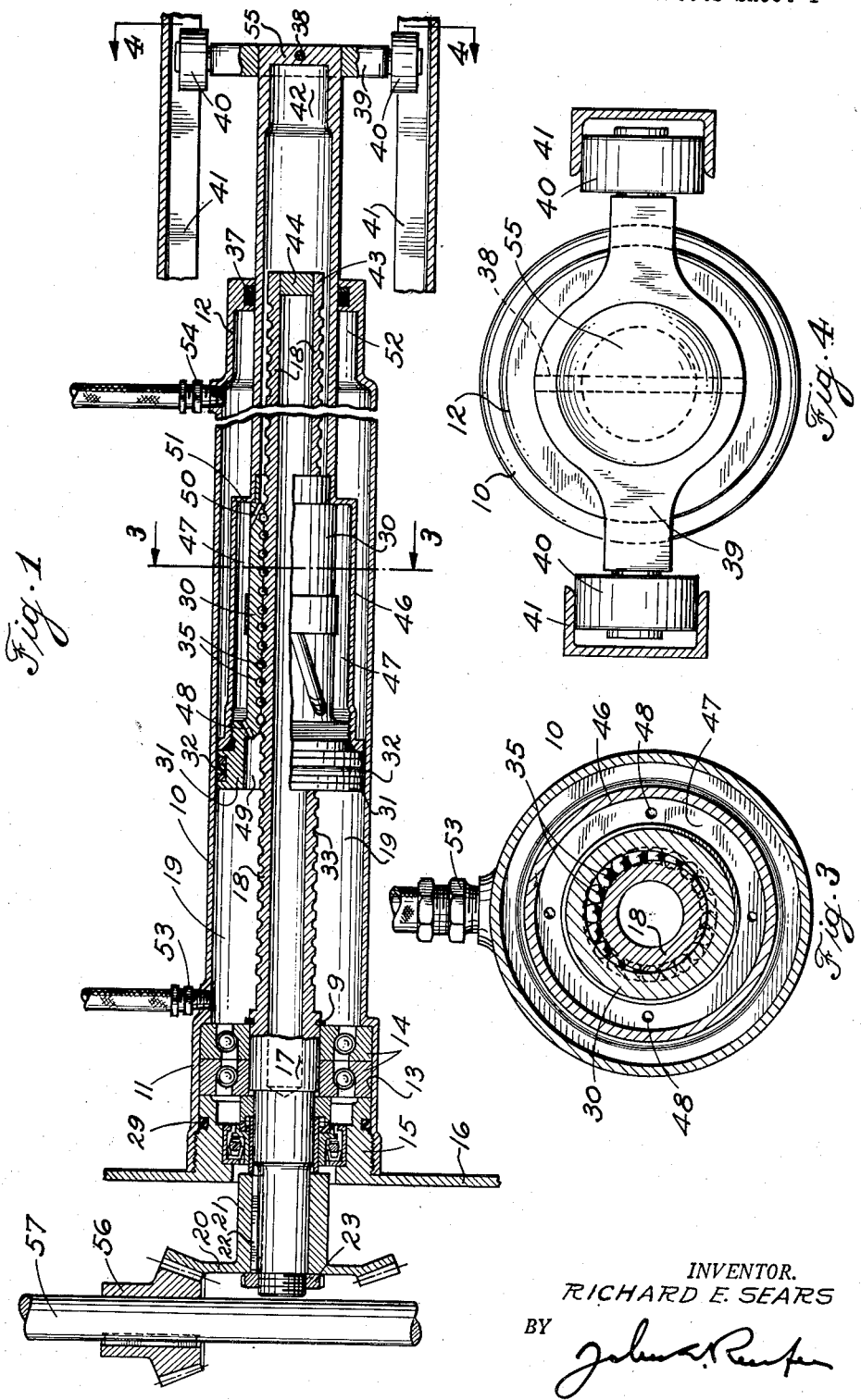
INVENTOR.
RICHARD E. SEARS
BY
ATTORNEY

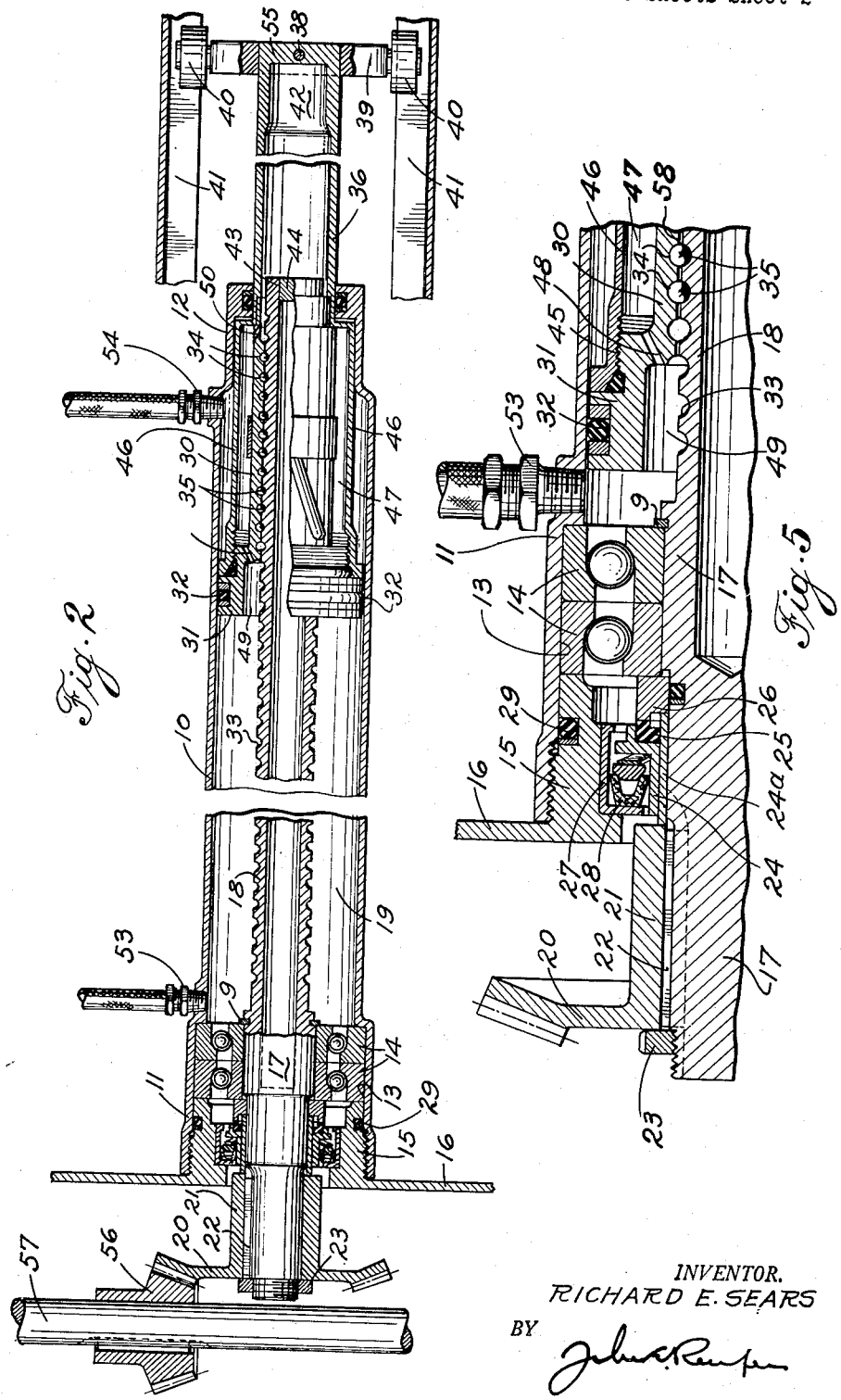

Sept. 14, 1954

R. E. SEARS 2,688,951

PRESSURE FLUID MOTOR

Filed Dec. 28, 1951

INVENTOR.
RICHARD E. SEARS
BY
ATTORNEY

Patented Sept. 14, 1954

2,688,951

UNITED STATES PATENT OFFICE 2,688,951

PRESSURE FLUID MOTOR

Richard E. Sears, Cleveland, Ohio, assignor to The Cleveland Pneumatic Tool Company, Cleveland, Ohio, a corporation of Ohio Application December 28, 1951, Serial No. 263,937

3 Claims. (Cl. 121—38)

This invention relates broadly to a fluid actuated motor of the expansible-chamber type, but more particularly to a mechanism for actuating aircraft components such as retractable landing gears, wings, wing flaps, doors and the like.

Because such components are usually mounted for pivotal or rotative movement relative to the aircraft, they have been heretofore actuated primarily by electric motors generally connected to the components through a reduction gearing mechanism. These motors and their installation were complicated in that they required controls to automatically shut them off at the ends of the required travel. Furthermore, in order to prevent the travel of the actuated components to suddenly end by impact upon the aircraft structure, it was necessary to provide such motors with complicated controlling devices such as switches and the like capable of slowing down their speed immediately prior the ends of the components' travel.

It is therefore one object of this invention to produce an aircraft component actuating mechanism consisting of a hydraulic piston longitudinally movable in its cylinder and associated with simple and efficient means for translating its rectilinear motion to a rotative movement of its driving or torque delivering element.

Another object of this invention is to produce such a hydraulic mechanism, constructed and arranged in a manner enabling it to deliver the exact number of revolutions required for each particular application.

Another object of this invention is to equip such mechanism with simple and efficient snubbing means for automatically slowing down its motion as the actuated component approaches the ends of travel.

Another object of this invention is to produce such hydraulic mechanism with a piston having opposed actuating areas, one greater than the other, the smaller one being preferably under constant pressure to enable aircraft components associated with the mechanism to be pressurized against their structural stops or preloaded in inoperative position.

Another object of this invention is to provide such hydraulic mechanism with a piston having opposed actuating areas of different size calculated to produce the required operating pressure of the aircraft components and controllable by a simple, effective and positive valve mechanism.

The invention also has for its object to provide a mechanism that is positive in operation, easily installed, economical of manufacture, relatively simple and of general superiority and serviceability.

For better understanding of the present invention, reference may be had to the accompanying drawings, in which:

Figure 1 is a longitudinal sectional view illustrating the actuating mechanism in partly extended position.

Figure 2 is a view similar to Figure 1, but illustrating the mechanism in fully extended position.

Figure 3 is an enlarged cross-sectional view taken on line 3—3 in Figure 1.

Figure 4 is an enlarged cross-sectional view taken on line 4—4 in Figure 1.

Figure 5 is an enlarged view of a portion of the mechanism shown in Figures 1 and 2.

Figure 6:
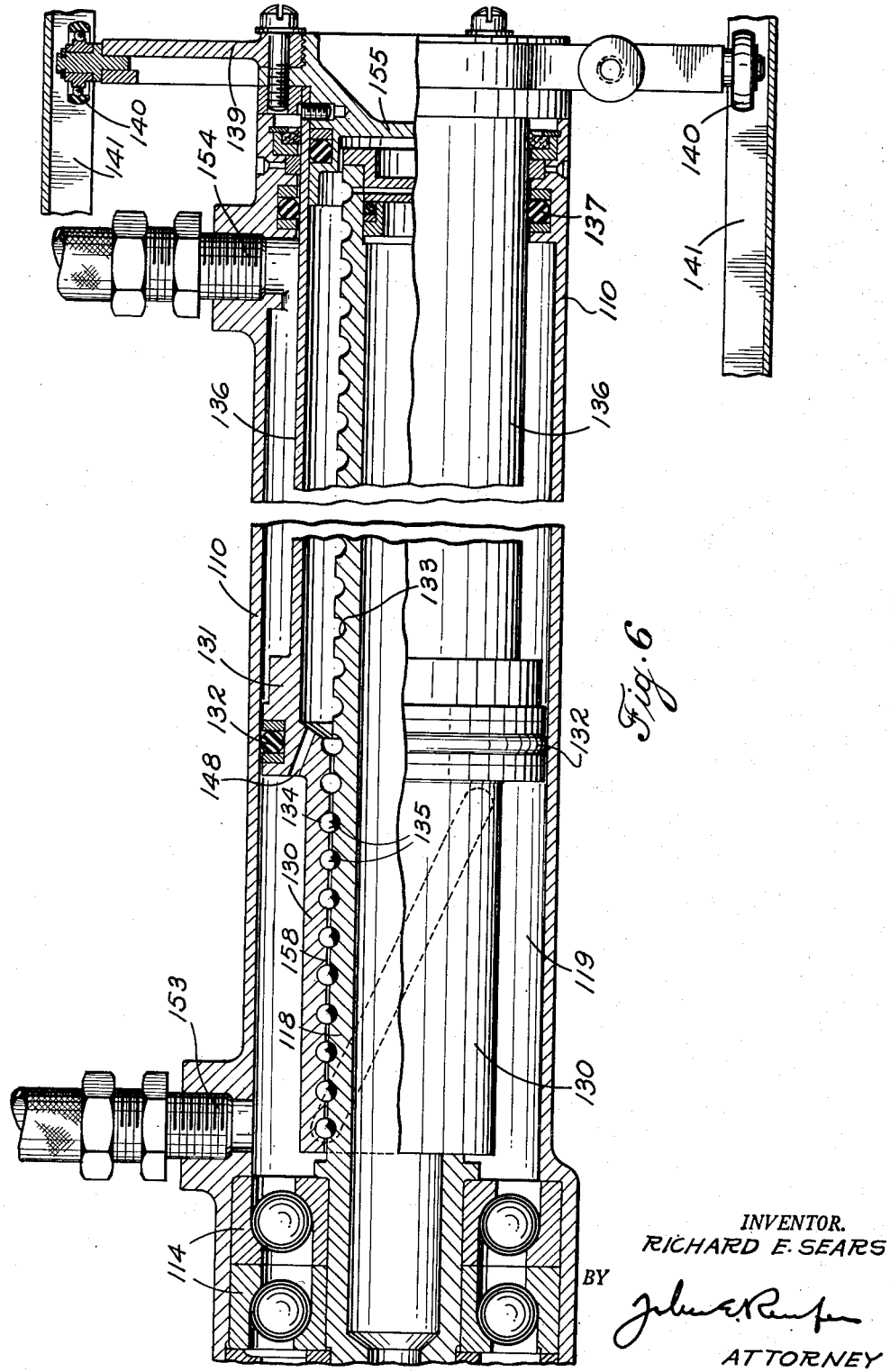
Figure 6 is an enlarged longitudinal view of a modified construction.

Referring to the drawings, 10 represents a substantially cylindrical casing formed with a somewhat enlarged outer end 11 and reduced inner end 12. The outer end 11 is provided with a flat bottom counterbore 13 accommodating two supporting and thrust bearings 14 held therein by a retainer 15, which is preferably screwed in the outer end of the counterbore and has a mounting flange 16 extending radially therefrom. Journalled in the bearings 14, there is the outer end portion 17 of a rotatable but non-axially movable shaft 18 which extends centrally through a cylindrical piston chamber 19 formed in the casing 10. Axial movement of the shaft toward the left in Figures 1 and 2 is prevented by a split ring 9 carried by the shaft for engagement with one side of bearings 14. Axial movement of the shaft in the other direction is prevented by several parts clamped between the bearings 14 and a nut 23 screwed on the extreme end of the shaft. These parts include the hub 21 of a bevel gear 20 which is keyed on the shaft exteriorly of retainer 15, by a key 22. The gear hub abuts against a packing cage 24 mounted in retainer 15, while the cage abuts against a resilient rubber made ring 25 which presses against a washer 26 engaging bearing 14. Packing cage 24 has a hood 27 closely fitted in retainer 15 and having mounted therein a suitable packing ring 28, which together with the ring 25 affords a fluid tight joint between retainer 15 and shaft outer end portion 17. Another fluid tight joint is obtained by a ring packing 29 located between retainer 15 and the inner wall of counterbore 13.

Axially movable in the chamber 19, there is a piston 30 formed with an integral head 31 carrying a ring packing 32 which assures a sliding but fluid tight fit of the piston head with the wall of chamber 19. Piston 30 has a bore 58 extending centrally therethrough and having the shaft 18 loosely fitted therein. In the economy of weight, the bore 58 in the head 31 is enlarged to form a counterbore 49. Interiorly of the piston, that is, in its bore 58, there is provided a spiral groove 34, while a similar and complemental groove 33 is provided upon the shaft 18. In the grooves 34, 33 are placed a series of anti-friction balls 35 which interconnect the piston and shaft for effecting translation of the axial movement of the piston to a rotative movement of the shaft, as hereinafter more fully described. In practice it is preferred to alternate large and small balls in the grooves of the piston and shaft as fully described in United States No. 2,298,011.

Fastened to the end of piston 30, there is a coaxial tubular extension 36 which extends through the inner end 12 of casing 10, a fluid tight joint being provided therebetween by a ring packing 37 mounted in the end of the casing. The outer end of extension 36 is closed as at 55, and has rigidly secured thereto by a cross pin 38 a torque arm 39 which extends transversely thereof. On the ends of the torque arm are operatively mounted anti-friction rollers 40 adapted to ride in channel shaped parallel spaced tracks 41 rigidly mounted in the aircraft. Adjacent its closed end, the extension 36 is internally reduced to form a snubbing or dash pot chamber 42 in which is adapted to fit closely the free ungrooved end 43 of the shaft 18. In the economy of weight, the shaft 18 is hollowed, and to save on the volume and weight of the operating fluid, its free end is closed by a plug 44.

Rigidly secured to the piston head 31 by any suitable means, such as a screw threaded connection 45, there is a sleeve 46 which extends over the piston 30 and forms a cylindrical enlargement for the extension 36. This enlargement is in spaced relationship with the piston to form therebetween a cylindrical passageway 47. This passageway communicates with the piston chamber 19 through one or more piston ports 48 which open into the piston counterbore 49. The other end of passageway 47 communicates with the interior of the extension tube 36 through one or more ports 50. The free end of the sleeve 46 is turned inwardly to become an integral part of the piston extension 36 and to form an annular end wall 51. The inner end 12 of housing 10 is internally machined to form a snubbing or dash pot chamber 52 adapted to receive the adjacent end portion of sleeve 46.

Opening in the end of the piston chamber 19 adjacent the counterbore 13, there is one end of a flexible conduit 53, while a similar conduit 54 opens in the other end of the chamber.

The operation of the mechanism so far described is as follows:

Pressure fluid may be admitted into the piston chamber 19 through one of the conduits 53, 54 and exhausted through the other. In practice, the conduits lead from an adequate source of pressure fluid such as a reservoir or pressure generating mechanism mounted within the aircraft structure, admission and exhaust of pressure fluid through the conduits being controlled by any suitable valve mechanism (not shown). When pressure fluid is admitted into the piston chamber 19 through conduit 53 and exhausted through conduit 54, it will flow through the piston counterbore 49 and piston port 48 into passageway 47 and therefrom to the closed end of tubular extension 36 through port 50, thereby acting on the piston 30 and the closed end 55 of the tube 36 for effecting extension of the mechanism. During the extension stroke of the piston, its effective pressure area or extension area is equal to the cross area of the piston chamber 19. As the extension of the mechanism continues, the pressure fluid previously admitted in the piston chamber 19 through conduit 54, is now free to exhaust from the right side of the piston in Figures 1 and 2 through conduit 54 until the piston sleeve 46 enters the snubbing chamber 52 to produce a dash pot or snubbing action which gradually retards the speed of the piston until the end of its extension stroke is effected by the end 51 of the sleeve 46 contacting the bottom of the chamber 52.

The extension stroke of piston 30 is of course also imparted to its extension 36, causing the anti-friction rollers 40 to ride in the stationary tracks 41, thereby holding the piston 30 against rotation. Through the agency of the balls 35 interconnecting the spiral grooves 33, 34 of the shaft and piston 18, 30 respectively, the rectilinear movement of the piston is translated into a rotative movement in one direction of the shaft 18, the resulting thrust being taken by the thrust bearings 14.

When pressure fluid is admitted into the piston chamber 19 through conduit 54 and exhausted through conduit 53, it will act on the right side of the piston in Figures 1 and 2, and on the end 51 of the piston sleeve 46 for effecting retraction of the mechanism. In this instance, the piston effective pressure area or retraction area is equal to the cross area of the piston chamber 19 less the cross area of the piston extension 36, and is therefore substantially smaller than the pressure area effecting the extension of the mechanism. During the retraction stroke of the piston, the pressure fluid previously admitted in the piston chamber 19 on the left side of the piston and in the extension tube 36, is free to exhaust therefrom through the conduit 53 until the free end of the shaft 18 enters the snubbing chamber 42 to produce a dash pot or snubbing action which gradually retards the speed of the piston until the end of the retraction stroke is effected by the shaft end 43 contacting the bottom of the chamber 42.

During retraction of the mechanism, the piston 30 being held against rotation will cause the shaft 18 to rotate in a direction opposite to that resulting from the extension stroke of the piston.

From the foregoing description, it will be understood that the output of the mechanism is entirely torque. That is, that the axial movement of the piston 30 in both directions effects rotation of the shaft 18 in one or the other direction. In practice the gear 20, keyed on the shaft for rotation therewith, is operatively connected to the aircraft component intended to be actuated, by any suitable means such as a bevel pinion 56 in mesh with the gear 20 and keyed on a shaft 57.

When the mechanism is actuated in the manner above described, it would be associated with a hydraulic system including a four-way valve to control admission and exhaust of the pressure fluid through conduits 53 and 54. In many applications of the mechanism, it has been found advantageous to have the conduit 54 free of any controlling valve and directly connected to the source of pressure fluid of the hydraulic system, thereby constantly subjecting the small or retracting area of the piston 30 to the action of the pressure fluid. In this type of installation the conduit 53 is controlled preferably by a three-way valve, through which it can be selectively connected either to the return line of the system, the pressure fluid inlet line or be shut off entirely. With the conduit 53 connected to the inlet line, pressure fluid is admitted on the large or extension area of the piston to effect the extension of the mechanism in the manner above referred to but against the constant pressure exerted on the piston retraction area. When conduit 53 is connected to the return line of the system, the constant pressure acting on the retraction area will effect the retraction of the mechanism and thereafter exert constant pressure on the piston 30 and consequently on the aircraft components actuated thereby to maintain them pressurized or preloaded against their structural stops at the end of their possible travel into inoperative position, thereby eliminating the use of any locking devices heretofore used to prevent their unintentional movement from inoperative static position.

The elimination of a control valve in the conduit 54 is also advantageous in emergency operation, when it is necessary to quickly effect extension of aircraft components such as wing flaps. In such instance, pressure fluid admitted on the large or extension area of piston 30 becomes immediately effective to cause extension of the mechanism without first having to connect the conduit 54 to a return line incorporated in the hydraulic system.

The piston retracting area being smaller than the cross area of the piston chamber 19, can by design be changed to produce the desired torque for each particular installation.

In the modified construction shown in Figure 6, the piston 130 extends to the left side of its integral head 131, which also carries a ring packing 132, while the piston extension 136 is located on the right side of the piston head 131 for slidable movement therewith and through the end 112 of casing 110, which is packed by a ring packing 137. As in the other constructions, the piston 130 has a bore 158 extending centrally therethrough in which is loosely fitted a shaft 118 supported by bearings 114 located in one end of a casing 110. Interiorly of the piston and upon the shaft are provided complemental spiral grooves 134 and 133 in which are located a plurality of balls 135.

Secured to the free end of piston extension 136 by screws 159, there is a torque arm 139 carrying rollers 140 adapted to ride a pair of parallel spaced tracks 141 rigidly mounted in the aircraft structure.

The free end of the piston extension 136 is closed as at 155 and its interior connected to the right side of the piston 130 through a port 148.

Pressure fluid may be admitted into the piston chamber 119 through one of the conduits 153, 154 and exhausted through the other. When pressure fluid is admitted through conduit 153, it will effect the extension of the mechanism by acting on end of piston 130, its head 131 and bottom 155 of extension 136 through port 148. In other words, during the extension stroke of the piston, the effective pressure area is equal to the cross area of the piston chamber 119. When pressure fluid is admitted through conduit 154, it will effect the retraction of the mechanism by acting on the right side of Figure 6, of the piston head 131, in which instance the effective pressure area is equal to the cross area of chamber 119 less the cross area of piston extension 136.

As in the other constructions, axial movement of the piston 130 is translated into rotative movement of the shaft 118, through the agency of the balls 135 interconnecting the spiral grooves 133, 134 of the shaft and piston.

The main advantage of this modified construction resides in the simplification of the piston 130, which extends on both sides of its heads 131, and is therefore easier and less costly to manufacture than the piston 30 which is located on one side of its head and is surrounded by the extension 36.

While the mechanism can be used for operation of any aircraft components, it has been found especially applicable to wing flap operation, in which instance the shaft 57 extends in both directions into the wings where it is operatively associated with flap actuating screw jacks or the like. In such installation, the difference in effective pressure areas between the extension and retraction strokes is a marked advantage. Most flaps require a greater torque to extend them than to retract them, a condition which is automatically met by the differential pressure areas of the piston 30. The diameter of the piston chamber 19, that is, the extension pressure area of the piston, as well as the diameter of the tube 36 which controls the piston's retraction area, are preferably calculated to produce the desired torque output of the mechanism for each particular application.

Another advantage of the present construction resides in its ability to deliver the exact number of revolutions needed for accurate operation of a given component, without the use of often complicated valves, switches and the like. Since the maximum number of revolutions of the gear 20 is controlled by the length of the piston stroke divided by the lead of the grooves 33, 34, it is a simple matter to provide a stroke and lead which will produce the desired number of revolutions.

As a result of the dash pot action taking place at the end of both extension and retraction strokes, it has been found that the operation of the mechanism is entirely free of vibration or impacts which would otherwise occur from sudden termination of the piston's travel by contact of the sleeve 30 or screw end 43 with the bottom of piston chamber 19 or tube 36 respectively.

Although the foregoing description is necessarily of a detailed character, it is to be understood that details of structure and arrangement of parts shown and described may be variously changed and modified without limiting the scope of the following claims.

I claim:

1. A mechanism for actuating aircraft components or the like, comprising a casing and a piston axially movable therein, a non-axially movable shaft extending centrally through said piston susceptible of rotation relative thereto, an extension fixed to said piston for axial movement therewith and through the inner end of said casing, a cylindrical enlargement on said extension adjacent said piston, piston rotation preventing means exteriorly of said casing operatively associated with said extension, fluid pressure means to impart axial movement to said piston, and spiral shaped interconnecting means between said piston and shaft effecting translation from axial movement of said piston to rotative movement of said shaft, a first snubbing chamber in the inner end of said casing cooperating with said cylindrical enlargement and a second snubbing chamber in the outer end of said extension cooperating with one end of said shaft to dampen movement of said piston near one end of its travel in one direction by said first chamber and in the other by said second chamber.

2. A mechanism for actuating aircraft components or the like, comprising a casing formed with a piston chamber, a non-axially movable shaft extending centrally through said piston susceptible of rotation relative thereto, an extension fixed to said piston for axial movement therewith and through the inner end of said casing, a cylindrical enlargement on said extension adjacent said piston, a torque arm transversely carried by said extension exteriorly of said casing, a pair of parallel laterally spaced stationary tracks exteriorly of said casing, anti-friction rollers carried by said arm adapted to ride said tracks upon axial movement of said piston to prevent its rotation, opposed pressure areas on said piston, one greater than the other, fluid pressure means active on one or the other of said pressure areas to impart axial movement to said piston in one or the other direction, complemental spiral grooves interiorly of said piston and upon said shaft, and a series of balls interengaged between said piston and shaft in the grooves thereof to translate axial movement of said piston to rotative movement of said shaft, a first snubbing chamber in the inner end of said casing cooperating with said cylindrical enlargement and a second snubbing chamber in the outer end of said extension cooperating with one end of said shaft to dampen movement of said piston near one end of its travel in one direction by said first chamber and in the other by said second chamber.

3. A mechanism according to claim 2 in which one of the opposed pressure areas of the piston is equal to the cross area of said chamber and the other is equal to said cross area less the cross area of said extension.

References Cited in the file of this patent

UNITED STATES PATENTS

| Number | Name | Date |
|---|---|---|
| 243,450 | Lafargue | June 28, 1881 |
| 547,459 | Seymour | Oct. 8, 1895 |
| 1,208,115 | Eynon | Dec. 12, 1916 |
| 2,375,029 | Nardone | May 1, 1945 |
| 2,493,602 | Sterrett | Jan. 3, 1950 |
| 2,509,472 | Billeter | May 30, 1950 |

FOREIGN PATENTS

| Number | Country | Date |
|---|---|---|
| 470,099 | Great Britain | Aug. 3, 1937 |